(12) United States Patent
Cummings

(10) Patent No.: US 6,416,670 B1
(45) Date of Patent: Jul. 9, 2002

(54) REGENERABLE HYDROCARBON FILTER

(75) Inventor: Arthur L. Cummings, Friendswood, TX (US)

(73) Assignee: MPR Services, Inc., Charlotte, NC (US)

( * ) Notice: Subject to any disclaimer, the term of this patent is extended or adjusted under 35 U.S.C. 154(b) by 0 days.

(21) Appl. No.: 09/267,813

(22) Filed: Mar. 12, 1999

(51) Int. Cl.⁷ .............................................. B01D 15/04
(52) U.S. Cl. ................... 210/673; 210/677; 210/692; 210/693
(58) Field of Search ................. 210/670, 673, 210/677, 690, 692, 693; 521/26

(56) References Cited

U.S. PATENT DOCUMENTS

| | | | |
|---|---|---|---|
| 2,718,489 A | 9/1955 | Coonradt et al. | 196/24 |
| 2,762,852 A | 9/1956 | Litton | 260/674 |
| 2,797,188 A | 6/1957 | Taylor et al. | 196/32 |
| 2,963,519 A | 12/1960 | Kasperik et al. | 260/676 |
| 2,974,178 A * | 3/1961 | Hwa et al. | 210/690 |
| 3,478,873 A | 11/1969 | McLean | 252/360 |
| 3,729,410 A * | 4/1973 | Abadie et al. | 210/693 |
| 3,922,217 A * | 11/1975 | Cohen et al. | 210/674 |
| 3,969,344 A | 7/1976 | Ackermann et al. | 260/343.5 |
| 4,477,419 A | 10/1984 | Pearce et al. | 423/228 |
| 4,481,113 A | 11/1984 | Canevari | 210/680 |
| 4,578,194 A | 3/1986 | Reinartz et al. | 210/673 |
| 4,747,937 A | 5/1988 | Hilfman et al. | 210/909 |
| 4,775,475 A | 10/1988 | Johnson | 210/634 |
| 4,795,565 A | 1/1989 | Yan | 210/669 |
| 4,849,095 A | 7/1989 | Johnson et al. | 210/673 |
| 4,970,344 A | 11/1990 | Keller | 564/497 |
| 5,006,258 A | 4/1991 | Veatch et al. | 210/677 |
| 5,045,291 A * | 9/1991 | Keller | 210/686 |
| 5,162,084 A | 11/1992 | Cummings et al. | 210/662 |
| 5,277,822 A | 1/1994 | Higgins | 210/673 |
| 5,368,818 A * | 11/1994 | Cummings et al. | 210/670 |

FOREIGN PATENT DOCUMENTS

| | | |
|---|---|---|
| DE | 155 036 | 5/1982 |
| DE | 34 01 867 A1 | 8/1985 |
| EP | 0 004 470 A2 | 10/1979 |
| FR | 2 251 525 | 6/1975 |
| GB | 826144 | 12/1959 |

* cited by examiner

Primary Examiner—Ivars Cintins
(74) Attorney, Agent, or Firm—Alston & Bird LLP

(57) ABSTRACT

There is provided a process for removing hydrocarbons from hydrophilic solutions in which the adsorbent is regenerated in situ. A solution containing at least one hydrocarbon impurity is passed through a resin bed and the hydrocarbon is retained by the resin. The solution passes from the resin bed substantially reduced of hydrocarbons. The filtration bed containing the resin is regenerated in situ by passing a second liquid therethrough such that the hydrocarbon is removed in the second liquid stream and the resin is available for reuse.

16 Claims, 1 Drawing Sheet

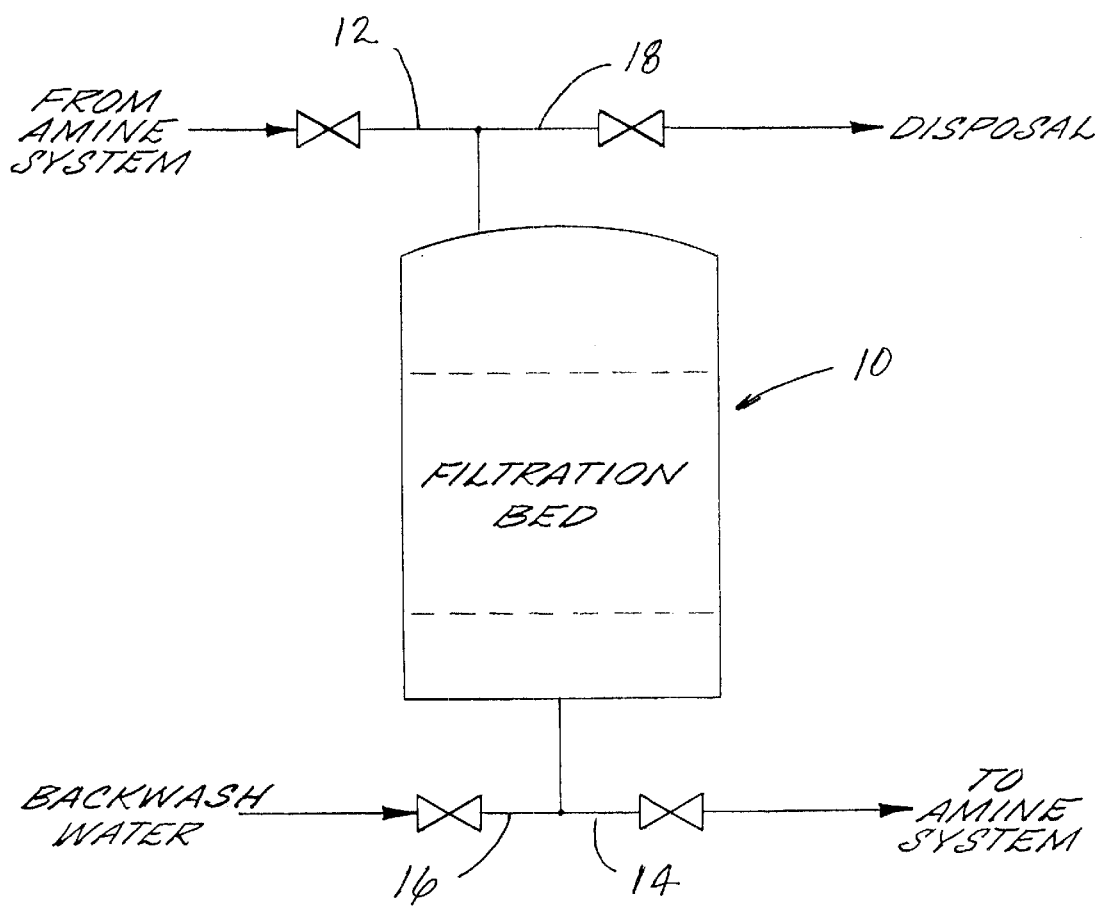

REGENERABLE HYDROCARBON FILTER

FIELD OF THE INVENTION

This invention relates to a process for removing hydrocarbons from a solution. More particularly, this invention relates to a process for absorbing hydrocarbons from a solution onto a medium and to the in situ regeneration of the absorbing medium. Typically, the solutions are composed of polar solvents, such as alkanolamines, glycols, sulfolane, and their aqueous mixtures.

BACKGROUND OF THE INVENTION

The removal of acid gases (such as $H_2S$ and $CO_2$) from natural gases, enhanced oil recovery gases, petroleum gases and liquids, tail gases, ammonia plant gases, coke oven gases, and the like, is commonly accomplished by alkanolamine sweetening units. When alkanolamine amine solutions are used to absorb acid gases from gas and liquid streams, hydrocarbons may also be absorbed or entrained in the alkanolamine solution.

The aqueous solutions of alkanolamines are contacted with streams containing $H_2S$ and $CO_2$, the $H_2S$ and $CO_2$ dissolve into the alkanolamine solution to form solvated alkanolamine salts (e.g., protonated alkanolamine cation with $HS^-$ and $HCO_3^-$ anions). The solution of water, unreacted alkanolamine, and alkanolamine salts is subjected to steam stripping to decompose the alkanolamine salts and remove $H_2S$ and $CO_2$ from the alkanolamine. Thiocyanate anion ($SCN^-$), for example, forms from the reaction of HCN with $H_2S$ or sulfides in the gases from crude units or catalytic reformers. Other typical alkanolamine salt anions include $S_2O_3^{2-}$, $SO_3^{2-}$, $SO_4^{2-}$, $HCO_2^-$, $CH_3CO_2^-$, and the like. These alkanolamine salts cannot be removed by steam stripping. Thus, they are called heat stable salts and remain in the system where they accumulate in the alkanolamine solution, gradually depleting the effectiveness of alkanolamine treatment.

Generally, the heat stable salt anions are removed by exchange with hydroxide from an anion exchange resin and cations, such as sodium and potassium, are removed by exchange with hydrogen ion from a cation exchange resin. Ion exchange to remove heat stable salts from alkanolamine solutions has been a subject in the patent literature for many years, see for example, Taylor, U.S. Pat. No. 2,797,188; Pearce, U.S. Pat. No. 4,477,419; Keller, U.S. Pat. No. 4,970,344; Yan, U.S. Pat. No. 4,795,565; Veatch, U.S. Pat. No. 5,006,258; and Cummings, U.S. Pat. No. 5,162,084.

Unfortunately, hydrocarbons also cause problems for alkanolamine system operations even at very low concentrations (i.e., cleaning natural gas). Scrubbing efficiency and stripping efficiency are reduced, foaming can cause upsets and solvent loss, production may be curtailed, and environmental discharge limits may be exceeded. The situation is mirrored in other solvent extraction processes that employ hydrophilic solvents such as glycol dehydrators. Current technology relies on absorption onto activated carbon granules to remove hydrocarbons from amine systems. For example, U.S. Pat. No. 2,762,852, is directed to an adsorption process in which a hydrocarbon is contacted with activated carbon. When saturated, the activated carbon must be separately regenerated or exchanged for new carbon. Thus activated carbon adsorption is expensive and labor intensive.

In another type of process, U.S. Pat. No. 2,963,519 uses a zeolitic molecular sieve as the adsorbent to remove small diameter hydrocarbons from petroleum refinery hydrocarbon streams. The molecular sieves are regenerated by heating and passing hot adsorbate through the bed.

In another process, that disclosed in German Patent No. 155,036, aromatics are removed from non-aqueous hydrocarbon mixtures by adsorption onto a cation ion-exchange resin that has been charged with silver ions. Adsorbed aromatics are desorbed by flowing water through the resin, then the adsorbed water is removed from the resin by evaporation or by flushing with a volatile solvent.

In yet another type of process, U.S. Pat. No. 2,718,489 to Coonradt et al., describes removing ionic mercaptans from non-aqueous hydrocarbon mixtures using ion exchange resins. After the ion exchange capacity of the resins is consumed, typical ionic regeneration of the resin is done. This patent has for its purpose a method of activating fresh or regenerated ion-exchange resin by contacting with one or a mixture of lower molecular weight monohydric alcohols prior to cleansing a hydrocarbon fluid. The activation is said to improve the effectiveness of the resin at removing mercaptans from hydrocarbon liquids.

Another type of process, U.S. Pat. No. 4,775,475 to Johnson, describes removing hydrocarbons from an aqueous feed stream by contacting the stream with an adsorbent whereby the spent adsorbent is regenerated by means of an elution solvent. Examples of suitable adsorbents include molecular sieves, amorphous silica-alumina gel, silica gel, activated carbon, activated alumina and clays. Examples of elution solvents include naphtha, kerosene, diesel fuel and gas oil.

It has been discovered that hydrocarbon impurities can be removed from hydrophillic solvent solutions by means of water-wet resins and that these resins can be regenerated without the use of hydrocarbon solvents.

It is, therefore, the general object of the present invention to provide a process for absorbing hydrocarbons from an alkanolamine-, glycol-, or other polar solvent-containing solution onto an ion exchange resin and to the in situ regeneration of the ion exchange resin.

Another object of this invention is to provide a process for regenerating a filter bed of ion exchange resin having a hydrocarbon adsorbed thereon.

SUMMARY OF THE INVENTION

In accordance with the present invention, there is provided a process for removing hydrocarbons from liquid streams such as an amine-containing solution or a glycol-containing solution by passing the solution through an ion exchange resin in a filtration bed, whereby the hydrocarbons are retained by the bed. The resin is either cation or anion exchange resin. The liquid stream passes through the ion exchange resin and leaves the filtration bed substantially reduced in hydrocarbon content.

The ion exchange resin may be regenerated in situ by removing the hydrocarbons from the resin bed by flowing water therethrough, such that the hydrocarbon is carried away in that liquid. The ion exchange resin may be reused to remove hydrocarbons from a liquid stream.

BRIEF DESCRIPTION OF THE DRAWINGS

Other objects, features and advantages of the invention will be apparent from the following detailed description taken in conjunction with the drawings.

FIG. 1 is a schematic flow diagram which illustrates a preferred embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The process of the present invention is used to remove hydrocarbons from liquid streams such as an amine-containing solution or a glycol-containing solution by passing the solution through an ion exchange resin, whereby the hydrocarbons are retained by the resin bed. The ion exchange resin is then regenerated in situ by removing the hydrocarbons from the ion exchange resin by flowing water therethrough, such that the hydrocarbon is carried away in that liquid.

An example of one system in which the process of the present invention may be used is shown in FIG. 1, wherein hydrocarbons are removed from a first liquid stream 12, such as an alkanolamine-containing solution and/or glycol-containing solution, as they separate from the liquid stream as it passes through filtration bed 10, composed of resin beads. The resin is a polymeric material, such as cation or anion exchange resin. When the first liquid stream is from an alkanolamine system it generally enters the filtration bed at a temperature of between about 0° F. and about 130° F. and a pressure of about 15 to 600 p.s.i. The liquid stream 14 passes from the resin bed substantially reduced in hydrocarbon content. In the case of an amine stream it is returned to the system.

The hydrocarbons may be removed from the filtration bed by flowing a second liquid stream 16, such as water, through the resin bed, such that the hydrocarbon is carried away in the second liquid stream 18 to disposal. Although it is not necessary to the operation of the process, the second liquid (backwash water) may be introduced to the filtration bed 10 at a temperature of between about 100° F. and 250° F., and a pressure of about 5 to 150 p.s.i. The flow rate is about 1 to 10 gallons/min/ft$^2$. The resin may be used again to remove undesirable hydrocarbons from a liquid stream.

The hydrocarbons in question include a variety of aliphatic and aromatic hydrocarbons such as those common to petroleum production, syngas production, steel production and chemical processing. Among the hydrocarbons are aliphatic and aromatic hydrocarbons, petroleum hydrocarbons, gasoline, kerosene, gas oil, waxes, and the like. These hydrocarbons are often present as mixtures of hydrocarbons.

Ion exchange resins exhibit the desired property for removing hydrocarbons from alkanolamine solutions and glycol solutions. Cation and anion exchange resins are similarly effective. Thus, one can assume it is not the ionic exchange capability that is important, rather it is the polymer structure, or perhaps a physical surface phenomenon that is responsible for effecting the desired separation.

Examples of resins include anion exchange resins of the strong base, weak base, strong cation and weak cation varieties. Examples of strong base anion exchange resins include styrene-divinylbenzene resins with quaternary alkanolamine groups attached to the polymer framework, such as Resintech™ SBG-2, Sybron Ionac™ ASB-2, Rohm and Haas Amberlite® IRA-410; styrene-divinylbenzene resins having quaternary amine functional groups, such as Dow SBR, Dow MSA-1, Rohm and Haas IRA-900 and IRA-400, ResinTech SBG1, SBMP1, and the like. Examples of strong acid cation resins include sulfonated stryrene-divinylbenzene resins, such as Dow HCR, ResinTech CG8 and CG10, Sybron C250, and Rohm and Haas IR-120. Examples of weak base anion exchange resins include stryrene-divinylbenzene resins with tertiary amine functional groups, such as Rohm and Haas IRA93/94, ResinTech WBMP, Sybron,AFP-329, and Dow MWA-1. Examples of weak acid cation exchange resins include acrylic resins such as Sybron CC, Rohm and Haas IRC84, Dow CCR-2 and ResinTech WACMP. The preceding resins are not intended to limit the resin which may be used in carrying out the process of this invention.

Alkanolamine-containing solutions from petroleum production refining, gas production, syn-gas production and. the like typically contain 30 to 85% water by weight. The alkanolamine solutions commonly used include, for example, monoethanolamine, methylethanolamine, diethanolamine, methyldiethanolamine, diisopropanolamine, triethanolamine, diglycolamine, proprietary hindered amines, proprietary mixtures of amines, and mixtures with physical solvents, like sulfolane, and various other mixtures.

Glycol-containing solutions typically contain from about 2% to about 80% water. Typical glycols used in dehydrator service and hydrate inhibition include monoethylene glycol, diethylene glycol, triethylene glycol and tetraethylene glycol.

The following examples are presented as illustrations of the invention.

EXAMPLE 1

To illustrate the adsorption of the resins used in the process of this invention kerosene was added to a 50% /50% methyldiethanolamine/water solution such that the kerosene concentration in the solution was about 100 ppm. The solution was passed through 100 ml. of strong base ion exchange resin. The effluent from the filtration bed was collected and the amount of unabsorbed kerosene was determined. The kerosene concentrations were:

| | |
|---|---|
| Original solution | 105 ppm |
| 1$^{st}$ pass effluent | 80 ppm |
| 2$^{nd}$ pass effluent | 11 ppm |

This means that the adsorption of hydrocarbons from the alkanolamine-containing solution was 90% effective.

EXAMPLE 2

A monoethanolamine solution from a petroleum refinery amine system was run through a bed of strong base anion exchange resin. The hydrocarbon concentrations in the amine were analyzed by gas chromatography as follows:

| | |
|---|---|
| Original solution | 19 ppm |
| 1$^{st}$ pass effluent | <5 ppm |

EXAMPLE 3

An anion exchange resin bed was used for 3 weeks removing heat stable salts from a refinery amine system. The amine solution also contained varying amounts of petroleum hydrocarbons. A heavy goo of hydrocarbon developed at and near the top of the resin bed that eventually severely reduced the ion exchange function of the resin. The resin was slurried with water and removed from the service vessel. The resin that came from most near the top of the vessel was most heavily coated with waxy goo and could not participate in the ion exchange. However, after flushing the resin in a column with hot water while agitating with nitrogen gas, the goo and resin separated. The recovered resin was tested and found to have acceptable ion exchange capacity. The hydrocarbon could also be separated from the resin with the aid of a detergent in water.

EXAMPLE 4

A cation exchange resin was used for several weeks removing cations from a refinery amine system. Upon opening the vessel, a greasy substance was observed on the top of the resin. Subsequently the resin was slurried with water and flushed from the vessel into an open container. A hydrocarbon layer appeared on top of the water as it separated from the resin below.

EXAMPLE 5

A five-foot diameter vessel was filled with anion exchange resin. Flow was taken from a circulating refinery amine system known to contain paraffins, including waxes, and passed through the resin bed at 60 to 90 gallons per minute for several days. Amine flow was stopped, the amine rinsed from the resin bed with ambient temperature water, and the resin bed was back-flushed with water at 150° F. to 160° F. at about 30 gpm, and the flushed material was collected in a settling tank. The cycle was repeated twice more. At the conclusion of the test, the flushed material was found to have a layer of wax on it, indicating transfer of wax from amine to the resin bed and from the resin bed to the settling tank.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A process for absorption of a hydrocarbon in a filtration bed containing a resin and in situ regeneration of said filtration bed comprising:
    (a) passing as a first liquid an alkanolamine/water solution containing at least one hydrocarbon through said resin bed;
    (b) absorbing said hydrocarbon from said first liquid onto said resin;
    (c) passing said alkanolamine/water solution from said resin substantially reduced of hydrocarbon; and
    (d) removing said hydrocarbon from said resin by passing water therethrough at a temperature between about 100° F. and about 250° F. at a pressure from about 5 p.s.i. to about 150 p.s.i. such that said hydrocarbon is substantially removed by said water passing therethrough.

2. The process according to claim 1 wherein said hydrocarbon is one or more petroleum hydrocarbons.

3. The process according to claim 1 wherein said resin is an ion exchange resin.

4. The process according to claim 3 wherein said ion exchange resin is an anion exchange resin.

5. The process according to claim 3 wherein said ion exchange resin is a cation exchange resin.

6. The process according to claim 1 wherein said alkanolamine is selected from the group consisting of monoethanolamine, methylethanolamine, diethanolamine, methyldiethanolamine, diisopropanolamine, triethanolamine, diglycolamine, proprietary hindered amines and their mixtures.

7. The process according to claim 1 wherein said first liquid is recirculated through the resin bed, each pass reducing the hydrocarbon content of said first liquid.

8. The process according to claim 1 wherein steps (a) through (d) are repeated cyclically.

9. A process for treating an amine-containing solution in a filtration bed containing an ion exchange resin and in situ regeneration of said filtration bed comprising:
    (a) passing said amine-containing solution containing at last one hydrocarbon through an ion exchange resin;
    (b) adsorbing said hydrocarbon from said amine-containing solution onto said ion exchange resin;
    (c) passing said amine-containing solution from said ion exchange resin substantially reduced of hydrocarbons; and
    (d) removing said hydrocarbon from said ion exchange resin by passing water therethrough at a temperature between about 100° F. and about 250° F. at a pressure from about 5 p.s.i. to about 150 p.s.i. such that said hydrocarbon is substantially removed by said water passing therethrough.

10. The process according to claim 9 wherein said amine containing solution is selected from the group consisting of monoethanolamine, methylethanolamine, diethanolamine, methyldiethanolamine, diisopropanolamine, triethanolamine, diglycolamine, proprietary hindered amines and their mixtures.

11. A process for absorption of a hydrocarbon in a filtration bed containing a resin and in situ regeneration of said filtration bed comprising:
    (a) passing as a first liquid, a glycol/water solution containing at least one hydrocarbon through said resin bed;
    (b) absorbing said hydrocarbon from said glycol/water solution onto said resin;
    (c) passing said glycol/water solution from said resin substantially reduced of hydrocarbon; and
    (d) removing said hydrocarbon from said resin by passing water therethrough at a temperature between about 100° F. and about 250° F. at a pressure from about 5 p.s.i. to about 150 p.s.i. such that said hydrocarbon is substantially removed by said water passing therethrough.

12. The process according to claim 11 wherein said hydrocarbon is one or more petroleum hydrocarbons.

13. The process according to claim 11 wherein said glycol is selected from the group consisting of monoethylene glycol, diethylene glycol, triethylene glycol, tetraethylene glycol.

14. The process according to claim 11 wherein said resin is an ion exchange resin.

15. The process according to claim 14 wherein said ion exchange resin is an anion exchange resin.

16. The process according to claim 14 wherein said ion exchange resin is a cation exchange resin.

* * * * *